United States Patent [19]
Carbine et al.

[11] Patent Number: 5,222,244
[45] Date of Patent: Jun. 22, 1993

[54] METHOD OF MODIFYING A MICROINSTRUCTION WITH OPERANDS SPECIFIED BY AN INSTRUCTION HELD IN AN ALIAS REGISTER

[75] Inventors: Adrian Carbine, Portland, Oreg.; Frank S. Smith, Chandler, Ariz.

[73] Assignee: Intel Corporation, Santa Clara, Calif.

[21] Appl. No.: 630,497

[22] Filed: Dec. 20, 1990

[51] Int. Cl.[5] .......................... G06F 9/22; G06F 9/34; G06F 9/40
[52] U.S. Cl. ..................... 395/800; 395/375; 364/DIG. 2; 364/931; 364/946.2; 364/946.5; 364/946.6; 364/946.7
[58] Field of Search ............................. 395/800, 375

[56] References Cited
U.S. PATENT DOCUMENTS
5,136,696 8/1992 Beckwith et al. .................. 355/375

Primary Examiner—Robert B. Harrell
Assistant Examiner—L. Donaghue
Attorney, Agent, or Firm—Owen L. Lamb

[57] ABSTRACT

An aliasing logic (100) in an instruction decoder. If a complex microinstruction flow is in progress, it operands can be accessed through alias registers (116). This allows indirect access to a source or destination register specified by the operands of the macrocode instruction or the opcode of the macroinstruction while executing a sequence of microinstructions. These aliased operands are maintained by the macroinstruction aliasing logic (100) in the register (116). The instruction decoder issues new instructions by driving a machine bus (110) with the correct information during each clock cycle. Mousetrap multiplexer (104) chooses between several sources of opcode and operand fields and routes the them to the machine bus (110) through several translation stages and multiplexers.

2 Claims, 5 Drawing Sheets

METHOD OF MODIFYING A MICROINSTRUCTION WITH OPERANDS SPECIFIED BY AN INSTRUCTION HELD IN AN ALIAS REGISTER

CROSS REFERENCES TO RELATED APPLICATIONS

This application is related to the following patents and copending patent applications:

U.S. Pat. No. 5,185,872 "Register Scoreboarding Extended to all Multiple-cycle operations in a Pipelined Microprocessor", granted Feb. 9, 1993;

U.S. Pat. No. 5,023,844 "Six-way Access Ported RAM Array Cell", granted Jun. 11, 1991;

"Data Bypass Structure in a Microprocessor Register File to Ensure Data Integrity", Ser. No. 07/488,254, filed Mar. 5, 1990;

"An Instruction Decoder That Issues Multiple Instructions in Accordance with Interdependencies of the Instructions" Ser. No. 07/630,536, filed Dec. 20, 1990;

"An Instruction Pipeline Sequencer With a Write-back Path" Ser. No. 07/630,535, filed Dec. 20, 1990;

"An Instruction Decoder Having Multiple Alias Registers Whoch Provide Indirect Access In Microcode to User Operands" Ser. No. 07/630,497, filed Dec. 20, 1990;

"A Microprocessor in Which Multiple Functions are Performed During Each Pipeline Stage" Ser. No. 07/630,499, filed Dec. 20, 1990;

"A Pipeline Sequencer With Alternate IP Selection when a Branch Lookahead Prediction Fails" Ser. No. 07/686,479, Apr. 17, 1991;

"High Bandwidth Output Hierarchical Memory Store Including a Cache, Fetch Buffer and ROM" Ser. No. 07/630,534, filed Dec. 20, 1990; all assigned to Intel Corporation.

BACKGROUND OF THE INVENTION

1. Field of the Invention

The invention relates to data processing systems and more particularly to a method and apparatus for allowing indirect access to the registers and opcode specified by an instruction kept in a special alias register.

2. Description of the Related Art

The microprocessor described in the above-identified copending application Ser. No. 07/630,499, filed Dec. 20, 1990, can handle both Reduced Instruction Set Computer (RISC) instructions and Complex Instruction Set Computer (CISC) instructions. The mechanisms used to implement the CISC is substantially identical in format to that used to implement the user RISC instruction set and can execute at a sustained rate of two instructions per clock cycle from an on-chip ROM. To supply instructions at this rate the instruction decoder has two major design issues: (1) it must be able to get in and out of the microcode quickly without bubbles of inactivity in the pipeline, and (2) it must get quick access within the microcode routine to operands specified by the CISC instruction.

The first issue is solved by the invention described in Copending application Ser. No. 07/630,536 wherein an instruction decoder is described which includes an instruction sequencer with a microcode translation ROM for providing initial instructions in microcode flows and a mousetrap multiplexer having four inputs and an output. The a first input of the mousetrap multiplexer is connected to an instruction bus and a second input of the mousetrap multiplexer is connected to the microcode translation ROM. The output of the mousetrap multiplexer is connected to a machine bus. The mousetrap multiplexer includes means for selecting at its inputs from one of either the instruction bus, or microcode translation ROM, operand and opcode fields and for driving the selected operand and opcode fields onto the machine bus. This provides a superscaler architecture in that the machine can issue and execute more than one instruction per clock. It has the advantage that since the microinstructions of the microcode are virtually identical to the RISC macroinstructions, a permanent cache of routines is stored in on-chip ROM that would in RISC machines have to come from off-chip. It is possible to issue two instructions per clock, which eliminates the bus bandwidth problems that would exist if all that code had to be fetched from off-chip.

The second issue of providing quick access within the microcode routine to operands specified by the CISC instruction is the subject of the present invention.

It is therefore an object of this invention to provide a method of quick access within the microcode routine to operands specified by a CISC instruction.

SUMMARY OF THE INVENTION

The above object is accomplished in accordance with the present invention by providing a set of alias registers from which an instruction decode can select an operand field. When a CISC instruction is found by lookahead logic, it is stored in the alias register. Individual fields from this alias register are patched into various fields of a microinstruction as it is issued on the machine bus for execution by a coprocessor on the bus. Microcode specifies which field of the user instruction it wants to substitute by using special assembler mnemonics. The mnemonics map to areas of a scratch register address space providing indirect register locations.

In accordance with an aspect of the invention, a method and means are provided for storing a first microinstruction in a first alias register and a second microinstruction in a second alias register in accordance with the state of a toggle bit, where one register is always available for loading while the other register is in use. This allows back-to-back issuing of instructions without "bubbles" in the pipeline for macroinstruction jumps into microcode.

The invention also has the advantage that since the opcode of the microinstruction can be specified in an indirect manner the microcode instruction can issue all of the user's instruction as part of itself.

The invention has the advantage that it provides indirect access to user operands.

BRIEF DESCRIPTION OF THE DRAWINGS

The foregoing and other objects, features, and advantages of the invention will be apparent from the following more particular description of a preferred embodiment of the invention as illustrated in the accompanying drawings, wherein.

DESCRIPTION OF THE PREFERRED EMBODIMENT

Figure 1:
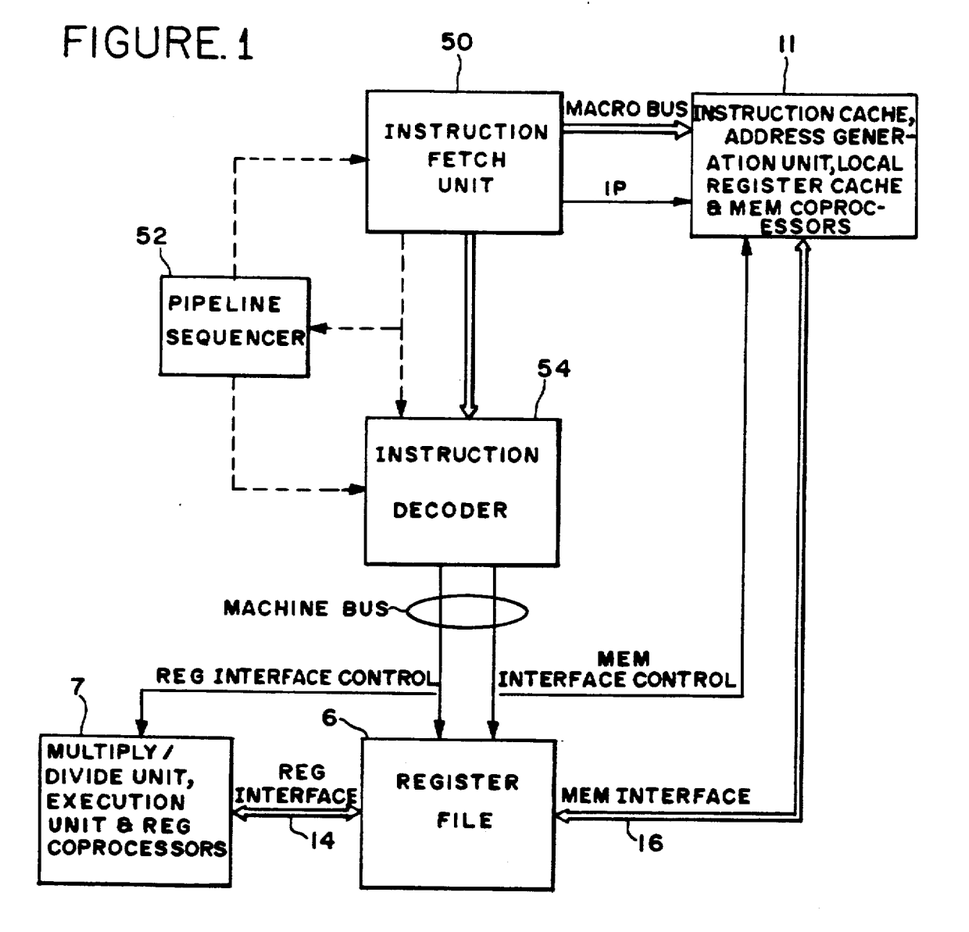
FIG. 1 is a block diagram of the microprocessor in which the present invention is embodied.

As shown in FIG. 1, the microprocessor in which the present invention is embodied includes an Instruction Sequencer which includes the Instruction Fetch Unit (50), the Instruction Decoder (54) and the Pipeline Sequencer (52, the Register File (6), the Multiply/Divide Unit, Execution Unit, and REG coprocessors block (7) and the instruction cache, Address Generation Unit, local register cache, and MEM coprocessors block (7). These units are briefly described below. For more detailed information about each of these units refer to the above-identified copending applications.

Instruction Cache includes an Instruction ROM (I-Cache) and provides the Instruction fetch unit (50) with instructions every cycle over the cache bus (macro Bus). The I-Cache is four words wide and is capable of supplying four words per clock over the Macro bus.

The instruction sequencer (IS) includes the Fetch Unit (IFU), the Instruction Decoder (ID) and the Pipeline Sequencer (PS). This instruction sequencer decodes the incoming four instruction words from the I-Cache. It can decode and issue up to three instructions per clock but it can never issue more than four instructions in two clocks. The instruction decoder (ID) and the pipeline sequencer (PS) are parts of the Instruction Sequencer. The IS decodes the instruction stream and drives the decoded instructions onto the machine bus which is the major control bus.

The Register File (6) has 16 local and 16 global registers. The RF has 4 independent read ports and 2 independent write ports to support the machine parallelism.

Execution Unit and Multiply-Divide Unit block (7) performs all the simple integer and ordinal operations and integer/ordinal multiply, divide, remainder, and modulo operations of the microprocessor in which the present invention is embodied.

The Address Generation Unit and Local Register Cache block (11) does the effective address calculations in parallel with the integer execution unit, and maintains a stack of multiple 16-word local register sets.

The microprocessor in which the present invention is embodied has two very high performance interfaces, the REG interface (14) and MEM interface (16). The REG interface is where all the REG format instructions are executed. The REG interface has two 64-bit source buses and a 64-bit destination bus. One instruction per clock can be issued on the REG interface.

The MEM interface (16) is where all MEM format instructions are executed. It also connects the system to the memory coprocessor. The AGU and LRC mentioned above are coprocessors on the MEM interface. The operations can be single or multi-cycle just as described above for the REG interface.

Figure 2:
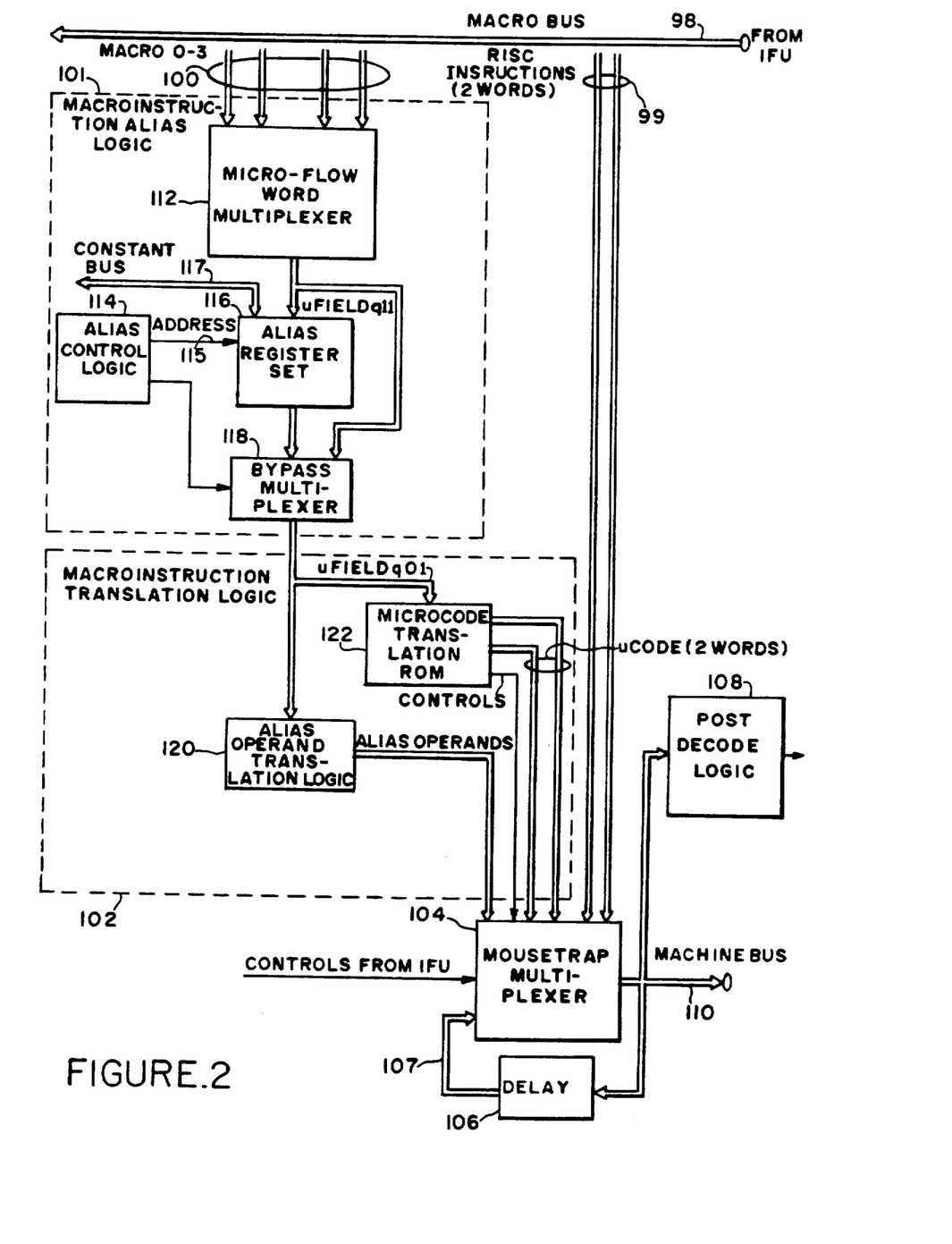
FIG. 2 is a block diagram of the instruction decoder shown in FIG. 1.

Refer to FIG. 2. As described in copending application Ser. No. 07/630,536, most instructions execute in a single clock cycle, but some complex instructions are implemented in microcode. The alias mechanism shown in FIG. 2 effectively substitutes certain fields in the current microinstruction with selected fields from the macroinstruction that initiated the microinstruction flow. These microinstructions can come from the microinstruction ROM or from off-chip through the IFU.

This alias mechanism is provided to allow access to the operands specified by the macroinstruction. The mechanism may also be used to manufacture macroinstructions under program control in order to optimize such microcode routines as self-test, initialization, etc.

A 32-bit alias register set (116) is provided. The aliasing mechanism allows indirect access to the registers and opcode specified by an instruction that are kept in this alias register. This indirect access is done by substituting fields (need not be the corresponding field) of the currently executing microinstruction with fields in the alias register. The 32-bit alias register is automatically loaded by the macroinstruction translation mechanism (for those instructions defined as microcoded) at or before the start of the macroinstruction, and the various fields of that instruction are thus available throughout execution of the microcode flow which implements that macroinstruction.

For example,

| modify g0, g1, g2 | # macroinstruction in alias register |
|---|---| where:
 src1alias=g0
 src2alias=g1
 dstalias=g2
is implemented with the following microcode routine:

| and | src1alias, src2alias, s8 |
|---|---|
| andnot | src1alias, dstalias, s9 |
| or | s8, s9, dstalias | will be executed as

| and | g0, g1, s8 |
|---|---|
| andnot | g0, g2, s9 |
| or | s8, s9, g2 |

TABLE I

Indirect Register Addressing

| Indirect Register | Syntax | Address | Address Allowed in these fields: |
|---|---|---|---|
| source1 | src1alias | s0 | src1,src2,dst |
| src 1 (high) | src1plus | s1 | src1 |
| source 2/base | src2alias/basealias | s2 | src1,src2,dst,bases |
| force reg src1 | regsrc1alias | s3 | src2 |
| source/dest | dstalias/1dadralias | s4 | src1,src2,dst,srcdst |
| dest (high) | dstplus | s5 | dst |
| mem opcode | memalias | OpC E8 | mem opcode |

Besides providing indirect access to registers, the alias mechanism provides a means to alias the opcode of a MEM-format instruction. The mnemonic recognized by the assembler is "memalias". In a similar fashion, the opcode of a memalias instruction is replaced with the opcode found in the alias register by the instruction sequencer before issuing the instruction. This allows a single microcoded routine to compute the effective address of a complex address mode in load/store instructions for all operand sizes.

Indirect Register Alias

Each indirect register is assigned a location in the scratch register address space, with the exception of Memalias, which is accessed by executing the opcode 'hE8. Table I summarizes these address assignments, the assembler syntax, and which microcode fields can use them. Some indirect registers cannot be used in some microinstruction fields, and that both REG and MEM format microinstructions can reference the same alias register, regardless of the format of the instruction contained therein. The aliasing mechanism does not support CTRL-format microinstructions, MEMB extended branch operations, or MEMB extended micro commands.

Some examples of microinstructions which use the alisas mechanism are shown below.

| movl | scrlalias,dstalias | \|move two words indirect |
| addo | s8, basealias, s8 | \|calculate complex address |
| memalias | (s8), ldadralias | \|issue aliased mem op |

Reading and Writing the Alias Registers

There are six alias registers, two for the current macroinstruction stream and four for other hardware process microcode assists. The macro alias registers are loaded alternately by the macroinstruction alias mechanism (100).

The alias registers can also be read and written directly in microcode, using extended micro-commands in an lda microinstruction.

| rdalias | read current alias register |
| ldalias | write current alias register |

An important characteristic for the microprogrammer to be aware of is that the contents of the alias register are interpreted differently, depending on how it was loaded. If the register was loaded by the translation look-ahead logic, the contents are treated as a macroinstruction; if it was loaded by a ldalias microinstruction, the contents are viewed as a microinstruction. This is important, because microinstructions have access to more resources than macroinstructions. For example, if a MEMA-format instruction were loaded into the register by the translation mechanism, a basealias can only access local or global registers, but not scratch registers. If the very same bit pattern were loaded into the alias register using ldalias, the basealias reference could not access local or global registers; only scratch registers would be available. This information is kept in a 33rd bit of each alias register.

The instruction in the alias register must have the bit inversions and placement shown in the hardware instruction formats shown in application Ser. No. 07/630,536. For example, a REG format instruction has bit 5 of the destination field inverted, so in order to specify a destination of scratch register 8 (which has an encoding of 'h68 or 'b1101000) in the alias register instruction, the destination field must be written with a value of 'b1001000. However, if the register was first loaded by the translation mechanism, that value can be read out, manipulated, and written back without an extra inversion, since it was written with the correct inversion to start with.

Tables II-VIII show the mapping or transfer function between the alias register contents and what the instruction decoder issues for operand register addresses. As mentioned above, this mapping changes depending on the means used to load the alias register, the format of the instruction contained in the alias register, and which indirect register is specified in which field of the microinstruction.

Refer to FIG. 2. There are 4 major blocks, the macroinstruction translation logic (102), the mousetrap block (104), and the post decode logic (108) which are described in copending application Ser. No. 07/630,536 and the macroinstruction alias logic (100) which is described herein.

The purpose of the alias block (100) is to store macroinstructions which are complex; that is they are microcoded. There are a number of registers that store these 32-bit instructions and the register is loaded from a number of different places.

There are four different words in the instruction stream (98) from the IFU that are examined in order to determine whether an upcoming instruction is complex. The microflow multiplexer (112) selects one of the four macroinstructions as being complex. Once that selection is made, it is loaded on a clock-by-clock basis into a particular alias register (116).

There are a six alias registers (116) that are selected in turn. Two of the alias registers are dedicated to the user codes. They have to be loaded on a back-to-back basis of each clock so that while one is being used, the next one is being loaded, and then the logic switches back and forth between the two of them. The translate block bit is toggled to determine which of the two registers is selected.

The other four alias registers are used by direct memory access (DMA) so that each DMA hardware process has its own alias register.

Once the alias register has been written with the next complex instruction opcode (32-bits), its contents are available at its output for use by the macroinstruction translation logic (102). Under certain circumstances, getting an instruction through the alias register is too slow; therefore a bypass is provided by a bypass multiplexer (118). This allows the simultaneous writing of the alias register (116) while passing the contents of the alias register to the macroinstruction translation logic (120). The 32-bit output of the bypass multiplexer (118) called uFIELDq01, contains the current complex instruction which is being implemented or being translated as part of a microcode flow.

uFIELDq01 goes to two places within the translation logic (102). One is the alias operand translation logic (120). This translates operands for use by the rest of the system. The other is the microcode translation ROM (122). The microcode translation ROM (122) translates the opcode into new microinstructions.

The operand translation logic (120) converts the operands into a format that can be understood by the rest of the system. The macroinstructions that are coded by the user, and the internal microinstructions, are very similar, but there is a small amount of translation that takes place between the two, and that is the function of the operand translation logic (120).

The translation ROM (122) is a large PLA which contains microinstructions. The microinstructions are the first two, or sometimes three (counting control flow change operations such as branching), microinstructions that are part of a microcode flow that implements a particular complex instruction. The contents of the translation ROM are a REG microinstruction, a MEM microinstruction, control flow bits, and the next fetch address in the microcode ROM. The single opcode of the complex macroinstruction corresponds to an entry in the translation ROM, and that entry contains the first several instructions that in prior systems would be stored in the microcode ROM. The reason for storing them in the translation ROM is so that they can be accessed much faster than would be the case of accessing them from the main microcode ROM in the IFU. Thus, when a complex instruction is encountered, its opcode is presented as an input to the translation ROM (122) along with some other controls signals. The output of the ROM will be the first three microinstructions to be executed so that the machine bus never sees the complex macroinstruction. Instead, the instructions that are put out in its place are these microinstructions from the translation ROM. Thus a clock cycle is not wasted while accessing the microcode ROM in the IFU. Instead immediate access is made to the first microinstructions that correspond to the first part of the microinstruction flow for the complex macroinstruction. The remainder of the flow comes from the main microinstruction ROM in the IFU over bus (99).

In summary, the alias operand translation logic (120) translates operands for use by the machine and the translation ROM (122) comes up with the first several instructions that pertain to the microcode flow.

The mousetrap multiplexer (104) is a large multiplexer which selects (on a field-by-field basis) from among several sources to generate a machine bus output (110) that goes throughout the the rest of the system. The machine bus controls all the functional units, such as the execution unit, the multiply-divide unit, the address-generation unit, and so forth.

The first source the mousetrap multiplexer (104) selects from are the outputs of the translation ROM (122), which are basically two words of microinstructions coming from the PLA.

The second source is two words from the macrobus (98), macro0 and macro1. These are RISC instructions, and can be either macroinstructions or microinstructions.

The third source is the output of the alias operand translation logic (120) which are alias operands. These are the operand fields and opcode that are a part of the instructions stored in the alias register (116). These are used for the purpose of doing indirect operations.

The fourth source of inputs to the mousetrap multiplexer (104) is the recirculate path from the delay (106). This is a delayed version of the current contents of the machine bus (110). The mousetrap multiplexer (104) can choose from among these input sources to output data on the machine bus. If RISC instructions are being executed, whether it be microinstructions or macroinstructions(user instructions) and they can be executed in a single clock, the source would be the macrobus (98) and there can be two words supplied, since two instructions can be executed per clock. On the other hand, if a complex instruction is being translated, the mousetrap selects the output of the translation ROM for the first two instructions to issue. Usually RISC code will be executing and the mousetrap (104) will execute the two instructions coming from the macrobus (98). If microcode is being executed, whether it comes from the microcode ROM, the macro lines, or is microcode from the translation ROM (122), (during the first clock in the microcode flow), the option is available of aliasing certain fields within that microinstruction.

If the machine is executing microcode, it can be aliased, which means that instead of issuing a field contained explicitly in the microinstruction, it is replaced with fields from the alias translation logic (100). This is, in effect, grafting out pieces of the 32-bit microinstruction, and replacing pieces of that on a field-by-field basis with corresponding or different fields specified through the use of the alias register by the macroinstruction. This is a way to obtain indirect addressing of certain registers.

Post Decode Logic (108)

The post decode logic (108) monitors the machine bus (110) each clock cycle, and decodes certain conditions that will cause action in different parts of the system, as described in copending application Ser. No. 07/630,536.

Microcode ROM

The microcode ROM is part of the instruction fetch unit (50) shown in FIG. 2 and described more fully in copending application Ser. No. 07/630,498. The RISC microinstructions issued by the microcode ROM come over the macrobus (98), four at a time. The timing appearance of the RISC microinstructions issued by the microcode ROM is no different than user RISC macroinstructions. They're both RISC. One of them is macro, one of them is micro.

The pipeline sequencer (52) is informed by the IFU when one of these complex instructions is coming up. The IFU does a predecode as it loads instructions in to the cache to determine whether the instruction is RISC or not. If it's not RISC, this must be a translatable instruction, and the IFU informs the pipeline sequencer. The pipeline sequencer determines how soon that instruction will be available. At an appropriate time it sends a signal to the ID informing the ID that the next instruction is not a RISC instruction, so it can't be executed as is. It needs to be translated, and instead of issuing that complex 32-bit instruction on the bus, microcode must be issued in its place.

The microflow word multiplexer logic (112) thus looks ahead in order to set-up the inputs to the translation ROM (122). So the translation ROM contains the first two either REG or MEM instructions so that the first part of the flow never misses a cycle.

The translation ROM contains not only the instructions, but it also contains the address in the microcode ROM to fetch the rest of the instructions from.

In addition to the two instruction words that are stored in the ROM, and microcode address that is stored in the ROM, some control bits are stored. The control bits indicate if the microinstructions are doing an aliasing, because alias operation can be done either from the translation ROM or from the microcode ROM, either one meaning patching in pieces of the macroinstruction into the microinstruction.

Alias Mapping Summary

Tables II through VIII show which macroinstruction bits stored in the alias register are mapped to each macroinstruction field. Tables II-IV are for REG macroinstruction fields and Tables V-VIII are for MEM macroinstruction fields. The following notation is used in the tables:

\* = This bit is cleared if the alias register is loaded by the translation mechanism; if the alias register is loaded by microcode, then the mapping is as shown.

% = These bits are always OR'ed with Countval value from the AGU.

Bit n of a particular machine bus field (source1, srcdst, etc.) can receive one of the following example values:

clr = bit n is a zero.
set = bit n is a one.
0 = bit n gets the value of alias register bit 0.
28# = bit n gets the value of alias register bit 28 inverted.

in table II if a user reg microinstruction uses scratch 0 (S0) as a source, what will be placed on the bus is the contents of the alias register (5, 11, 4, 3, 2, 1, 0, in row two of table II). If that instruction had instead been a mem microinstruction, then the upper two bits of the field would be cleared (clr, clr, in row three of table II) and the remaining bits would be output (4, 3, 2, 1, 0, in row three of table II).

TABLE II

Source 1 Address (S1adru11):

| "scratch register" (alias Field) selected in uinstr | alias instr format | machine bus source 1 address: | | | | | | |
|---|---|---|---|---|---|---|---|---|
| | | 6 | 5 | 4 | 3 | 2 | 1 | 0 |
| s0 (op1alias) | cobr | clr | clr | 4 | 3 | 2 | 1 | 0 |
| s0 (op1alias) | reg | 5 | 11 | 4 | 3 | 2 | 1 | 0 |
| s0 (op1alias) | mem | clr | clr | 4 | 3 | 2 | 1 | 0 |
| s1 (op1plus) | cobr | clr | clr | 4 | 3 | 2 | set | 0 |
| s1 (op1plus) | reg | 5 | 11 | 4 | 3 | 2 | set | 0 |
| s1 (op1plus) | mem | clr | clr | 4 | 3 | 2 | set | 0 |
| s1 (op1plus) | any | clr | set | clr | clr | clr | clr | clr |
| s2 (op2alias) | cobr | 0 | clr | 18 | 17 | 16 | 15 | 14 |
| s2 (op2alias) | reg | 6 | 12 | 18 | 17 | 16 | 15 | 14 |
| s2 (op2alias) | mema | clr | *set | 18 | 17 | 16 | 15 | 14 |
| s2 (op2alias) | memb ix | clr | *set | 18 | 17 | 16 | 15 | 14 |
| s2 (op2alias) | memb ex | clr | *9 | 18 | 17 | 16 | 15 | 14 |
| s4 (op3alias) | cobr | clr | 13 | 23 | 22 | 21 | %20 | %19 |
| s4 (op3alias) | reg | 28# | 13 | 23 | 22 | 21 | %20 | %19 |
| s4 (op3alias) | mem | *24 | *24 | 23 | 22 | 21 | %20 | %19 |

TABLE III

Source 2 Address (S2adru11):

| "scratch register" (alias Field) selected in uinstr | alias instr format | machine bus source 2 address: | | | | | | |
|---|---|---|---|---|---|---|---|---|
| | | 6 | 5 | 4 | 3 | 2 | 1 | 0 |
| s0 (op1alias) | cobr | clr | clr | 4 | 3 | 2 | 1 | 0 |
| s0 (op1alias) | reg | 5 | 11 | 4 | 3 | 2 | 1 | 0 |
| s0 (op1alias) | mem | clr | clr | 4 | 3 | 2 | 1 | 0 |
| s2 (op2alias) | cobr | 0 | clr | 18 | 17 | 16 | 15 | 14 |
| s2 (op2alias) | reg | 6 | 12 | 18 | 17 | 16 | 15 | 14 |
| s2 (op2alias) | mema | clr | *set | 18 | 17 | 16 | 15 | 14 |
| s2 (op2alias) | memb ix | clr | *set | 18 | 17 | 16 | 15 | 14 |
| s2 (op2alias) | memb ex | clr | *9 | 18 | 17 | 16 | 15 | 14 |
| s4 (op3alias) | cobr | clr | 13 | 23 | 22 | 21 | %20 | %19 |
| s4 (op3alias) | reg | 28# | 13 | 23 | 22 | 21 | %20 | %19 |
| s4 (op3alias) | mem | *24 | *24 | 23 | 22 | 21 | %20 | %19 |

TABLE IV

Destination Address (Dsadroutu11):

| "scratch register" (alias Field) selected in uinstr | alias instr format | machine bus destination address: | | | | | | |
|---|---|---|---|---|---|---|---|---|
| | | 6 | 5 | 4 | 3 | 2 | 1 | 0 |
| s0 (op1alias) | cobr | clr | clr | 4 | 3 | 2 | 1 | 0 |
| s0 (op1alias) | reg | 5 | 11 | 4 | 3 | 2 | 1 | 0 |
| s0 (op1alias) | mem | clr | clr | 4 | 3 | 2 | 1 | 0 |
| s2 (op2alias) | cobr | 0 | clr | 18 | 17 | 16 | 15 | 14 |
| s2 (op2alias) | reg | 6 | 12 | 18 | 17 | 16 | 15 | 14 |
| s2 (op2alias) | mema | clr | *set | 18 | 17 | 16 | 15 | 14 |
| s2 (op2alias) | memb ix | clr | *set | 18 | 17 | 16 | 15 | 14 |
| s2 (op2alias) | memb ex | clr | *9 | 18 | 17 | 16 | 15 | 14 |
| s4 (op3alias) | cobr | 13 | clr | 23 | 22 | 21 | %20 | %19 |
| s4 (op3alias) | reg | 13 | 28# | 23 | 22 | 21 | %20 | %19 |
| s4 (op3alias) | mem | *24 | *24 | 23 | 22 | 21 | %20 | %19 |
| s5 (op3plus) | cobr | 13 | clr | 23 | 22 | 21 | set | %19 |
| s5 (op3plus) | reg | 13 | 28# | 23 | 22 | 21 | set | %19 |
| s5 (op3plus) | mem | *24 | *24 | 23 | 22 | 21 | set | %19 |

*24 = bit n gets the value of alias register bit 24 if the alias register was written by microcode, otherwise it is cleared.

%19 = bit n gets the value of alias register bit 19 unless Countval bit 0 is set, in which case bit n is set.

The body of each table describes the bit number of an instruction that is seen on the macro bus. For example,

TABLE V

Base Address (Baseadru11):

| "scratch register" (alias Field) selected in uinstr | alias instr format | machine bus source 1 address: | | | | | |
|---|---|---|---|---|---|---|---|
| | | 5 | 4 | 3 | 2 | 1 | 0 |
| s2 (basealias) | cobr | clr | 18 | 17 | 16 | 15 | 14 |

TABLE V-continued

Base Address (Baseadru11):

| "scratch register" (alias Field) selected in uinstr | alias instr format | machine bus source 1 address: 5 | | 4 | 3 | 2 | 1 | 0 |
|---|---|---|---|---|---|---|---|---|
| s2 (basealias) | reg | |12 | 18 | 17 | 16 | 15 | 14 |
| s2 (basealias) | mema | |*set | 18 | 17 | 16 | 15 | 14 |
| s2 (basealias) | memb ix | |*set | 18 | 17 | 16 | 15 | 14 |
| s2 (basealias) | memb ex | |*9 | 18 | 17 | 16 | 15 | 14 |

TABLE VI

Source/Destination Address (LdAdru11):

| "scratch register" (alias Field) selected in uinstr | alias instr format | machine bus src/dst address: 5 | 4 | 3 | 2 | 1 | 0 |
|---|---|---|---|---|---|---|---|
| s4 (1dadralias) | cobr | |13 | 23 | 22 | 21 | %20 | %19 |
| s4 (1dadralais) | reg | |13 | 23 | 22 | 21 | %20 | %19 |
| s4 (1dadralais) | mem | |*24 | 23 | 22 | 21 | %20 | %19 |

TABLE VII

Type Field (TypeOutu11):

| "scratch register" (alias Field) selected in uinstr | alias instr format | machine bus type field: 3 | 2 | 1 | 0 |
|---|---|---|---|---|---|
| s4 (1dadralias) | cobr | |24 | 29 | 28 | 27 |
| s4 (1dadralias) | reg | |24 | 29 | 28 | 27 |
| s4 (1dadralias) | mem | |30 | 29 | 28 | 27 |

TABLE VIII

LdSt Field (LdStOutu11):

| "scratch register" (alias Field) selected in uinstr | alias instr format | machine bus type field: 3 | 2 | 1 | 0 |
|---|---|---|---|---|---|
| opcED (memalias) | cobr | |set | set | 26 | 25# |
| opcED (memalias) | reg | |set | set | 26 | 25# |
| opcED (memalias) | mem | |set | set | 26 | 25# |

Operation

Figure 3:
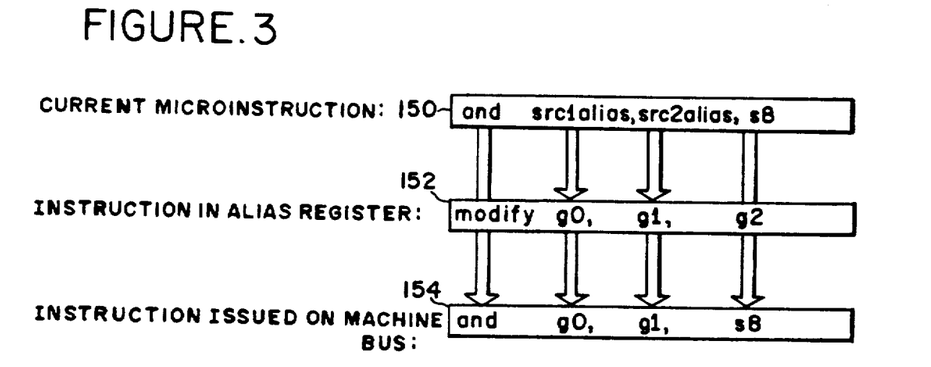
FIG. 3 is a first example of the aliasing function.

FIG. 3 is an example of the aliasing function where the current instruction (150) is an AND and the alias instruction (152) is a MODIFY. The instruction issued on the machine bus is as shown by the block (154).

At block (150) the AND instruction is read from the microcode translation ROM (122) and at block (152) the field of an aliased microinstruction is replaced with the operand (or opcode) found in the alias register by the instruction sequencer. At block (154) the instruction with the field from the alias register is issued.

Figure 4:
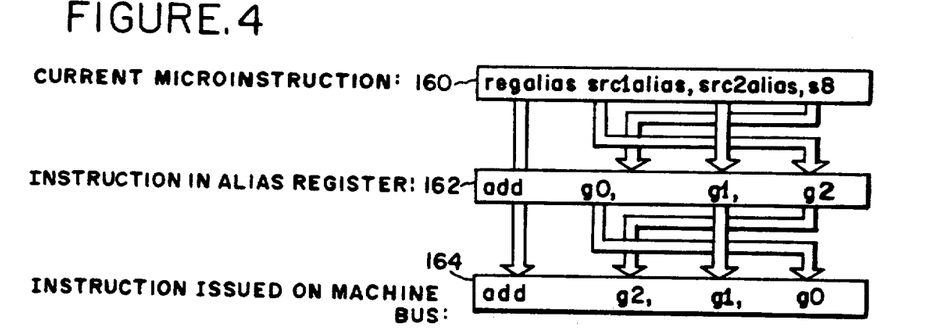
FIG. 4 is a second example of the aliasing function.

FIG. 4 is an example of the aliasing function where the current instruction (160) is a REGALIS and the alias instruction (162) is an ADD. The instruction issued on the machine bus is as shown by the block (164). At block (160) the REGALIS instruction is read from the microcode translation ROM (122) and at block (162) the field of an aliased microinstruction is replaced with the operand (or opcode) found in the alias register by the instruction sequencer. At block (164) the instruction with the field from the alias register is issued.

The over all operation of the alias logic is shown by the flow chart of FIGURE. The appropriate one of two 32-bit alias registers is selected for loading (156). The instruction is stored in register 0 (158) or register 1 (160) so that the various fields of that instruction are thus available throughout execution of the microcode flow which implements that macroinstruction.

The translate block bit indicates which of the two registers is the current alias register. The microinstruction is decoded and if a scratch register is specified in the microinstruction, then that is decoded to substitute the appropriate one of the fields specified in the table II-VIII.

Figure 5:
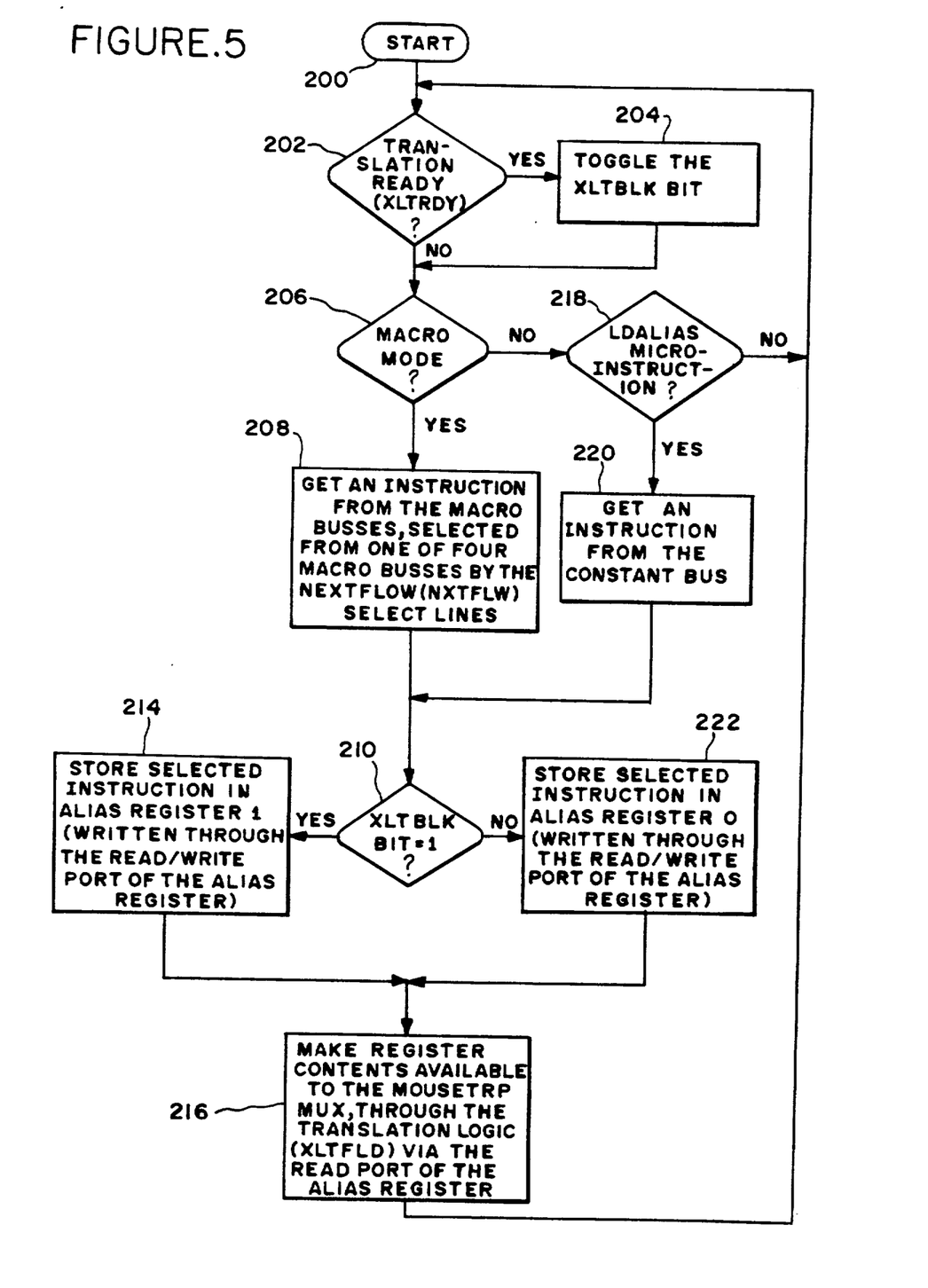
FIG. 5 is a flow diagram of the alias register operation.

Refer now to FIG. 5 which is a flowchart of the alias register operation. At the start of the operation (200), the translation-ready bit is checked (202) and if yes, the translate block bit is toggled (204). If the translation-ready bit is no, then the check is made to see if the apparatus is in macro mode (206). If yes, an instruction is gated from the macrobuses and is selected from one of four macrobuses by the next flow select lines (208). If the toggle bit in block 204 is set to a 1 (210), then the selected instruction is stored in alias register 1 by writing through the read/write port of the alias register (214). The alias register contents are made available to the mousetrap mux by going through the translation logic first through the read port of the alias register (216). If at the decision block (210) the translate-block bit is equal to 0, then the selected instruction is stored in the alias register 0 (222).

Returning to decision block 206, if the macromode is not set, then the microinstruction is checked to see if it is a load-alias microinstruction (218), which is a specific microinstruction for loading an alias register with a constant. If yes, an instruction is gated from the constant bus (220). If no, then the flow returns to the start of the flowchart (200).

Figure 6:
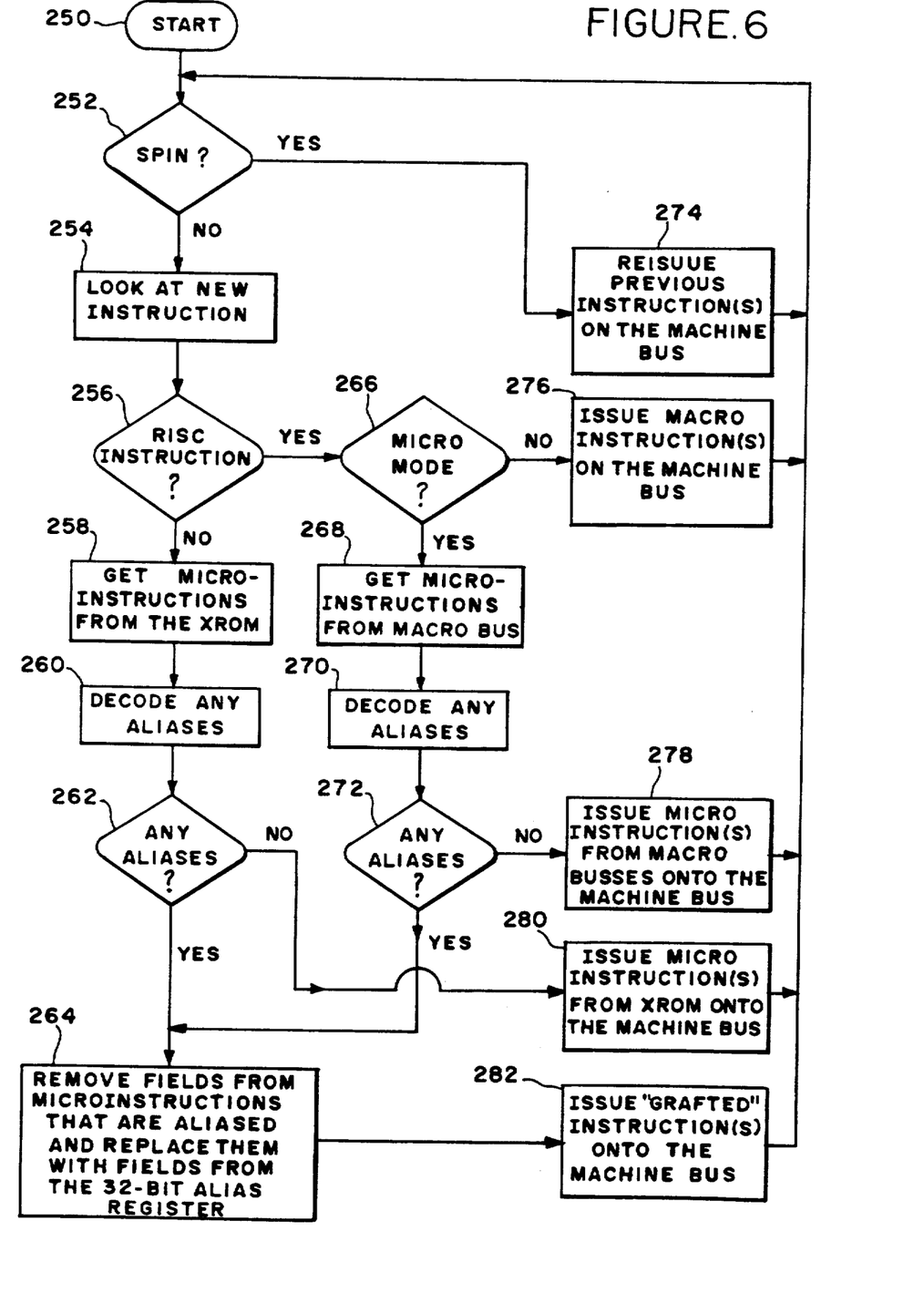
FIG. 6 is a flow diagram of the "mousetrap" mux operation.

Refer now to FIG. 6, which is a flow diagram of the mousetrap mux operation. As shown in FIG. 2, the machine bus (110) is gated back through a delay circuit (106) to the input (107) of the mousetrap multiplexer. This allows the multiplexer to reissue a previous instruction by recirculating the previous contents of the machine bus (110) through the delay circuit (106). This is done whenever the system is waiting because of a scoreboard miss. As long as the system is waiting, the same information is repeatedly driven to the machine bus. When the scoreboard bit is cleared, the correct instruction is still available at the bus and the sequence proceeds normally. This is illustrated by decision block (252). If the output of this block is yes, then the previous instruction is reissued on the machine bus (274). If the output of decision block (252) is no, then the logic looks at a new instruction (254). If the instruction is a RISC instruction (256), then the logic checks to see if it is in micro mode (266). If not, the macroinstruction is issued on the machine bus (276). If it is in macro mode, the output decision block (266) is yes, and the instruction is obtained from the macrobus (268). Next in the flow is to decode any alias instructions (270). If there are not any alias instructions (272), then the logic issues microinstructions from the macro buses onto the machine bus (278). If there are alias instructions, then the logic removes fields from the microinstructions that are aliased and replaces them with fields from the 32-bit alias register (264). The logic then issues the new grafted instructions on the machine bus (282). A similar flow occurs into the decision out of block 256 is no, that is if there are no RISC instructions. In this case, the microinstructions are obtained from the translation ROM (258). Next, any aliases are decoded (262) and if there are, the flow proceeds to block 264 as previously described. If not, then the microinstructions are obtained from the translation ROM and placed on the machine bus (280).

While the invention has been particularly shown and described with reference to preferred embodiments thereof, it will be understood by those skilled in the art that the foregoing and other changes in form and detail may be made therein without departing from the scope of the invention.

What is claimed is:

1. In an instruction sequencer including an alias register set (116), a microcode translation ROM (122) that stores a microcode flow which implements a macroinstruction, and a machine bus (110), said alias register set including a current alias register, said macroinstruction including an assembler mnemonic and an operand, a method comprising the steps of:

(A) storing (158; 160) said macroinstruction so that said fields of said macroinstruction are available throughout execution of a microcode flow which implements said macroinstruction;

(B) decoding said assembler mnemonic in said current alias register to determine which one field of said fields is to be substituted with a field of said current alias register;

(C) reading (164) a microinstruction from said microcode translation ROM (122), said microinstruction including fields;

(D) replacing (166) one of said fields of said microinstruction with said operand in said alias register to thereby produce a grafted instruction; and, (E) issuing (168) said grafted instruction on said machine bus (110).

2. The method in accordance with claim 1 wherein said alias register set includes a first register and a second register, and a translate block bit, said method comprising the further steps of:

(F) setting said translate block bit to a first state or to a second state;

(G) selecting for storing either said first register in response to said translate block bit being in said first state or said second register in response to said translate block bit being in said second state, resulting in there being one selected register;

(H) storing a first microinstruction in said one selected register.

* * * * *